US010659480B2

(12) United States Patent
Arcamone et al.

(10) Patent No.: US 10,659,480 B2
(45) Date of Patent: *May 19, 2020

(54) INTEGRATED NETWORK THREAT ANALYSIS

(71) Applicant: InQuest, LLC, Arlington, VA (US)

(72) Inventors: Michael Arcamone, Arlington, VA (US); Matthew Diehl, Arlington, VA (US)

(73) Assignee: INQUEST, LLC, Arlington, VA (US)

(*) Notice: Subject to any disclaimer, the term of this patent is extended or adjusted under 35 U.S.C. 154(b) by 158 days.

This patent is subject to a terminal disclaimer.

(21) Appl. No.: 15/097,241

(22) Filed: Apr. 12, 2016

(65) Prior Publication Data
US 2016/0226903 A1    Aug. 4, 2016

Related U.S. Application Data

(63) Continuation-in-part of application No. 14/201,762, filed on Mar. 7, 2014, now Pat. No. 9,313,217.

(60) Provisional application No. 61/774,576, filed on Mar. 7, 2013.

(51) Int. Cl.
*H04L 29/06*    (2006.01)
(52) U.S. Cl.
CPC ................. *H04L 63/1425* (2013.01)
(58) Field of Classification Search
CPC ........................................... H04L 63/14–1425
USPC .......................................................... 726/23
See application file for complete search history.

(56) References Cited

U.S. PATENT DOCUMENTS

| | | | |
|---|---|---|---|
| 7,797,411 B1 | 9/2010 | Guruswamy et al. | |
| 8,302,192 B1 | 10/2012 | Cnudde et al. | |
| 8,468,589 B2 | 6/2013 | Krywaniuk | |
| 8,547,974 B1 | 10/2013 | Guruswamy et al. | |
| 8,887,249 B1 | 11/2014 | Schekochikhin et al. | |
| 8,914,406 B1* | 12/2014 | Haugsnes | H04L 63/0281 707/769 |
| 9,009,820 B1 | 4/2015 | McDougal | |
| 9,106,691 B1 | 8/2015 | Burger et al. | |
| 9,367,687 B1* | 6/2016 | Warshenbrot | G06F 21/566 |
| 2003/0021280 A1* | 1/2003 | Makinson | H04L 63/0209 370/401 |
| 2003/0145226 A1 | 7/2003 | Bruton | |
| 2004/0205360 A1 | 10/2004 | Norton et al. | |
| 2006/0161988 A1* | 7/2006 | Costea | G06F 21/56 726/25 |
| 2006/0206941 A1 | 9/2006 | Collins | |
| 2007/0079379 A1* | 4/2007 | Sprosts | G06Q 10/107 726/24 |

(Continued)

OTHER PUBLICATIONS

Arcamone et al., U.S. Office Action dated Aug. 26, 2015, directed to U.S. Appl. No. 14/201,762; 16 pages.

*Primary Examiner* — Matthew T Henning
(74) *Attorney, Agent, or Firm* — King & Spalding LLP

(57) ABSTRACT

The inventive systems and methods aggregate network information to accompany file information in an indicator and warning environment. This system also provides a user interface to search for files using network attributes or file attributes, such as message digest. The system can include threat scoring functionality that can be configured to calculate a threat score based on a combination of the result of file analysis on one or more files and associated network data capture information.

20 Claims, 20 Drawing Sheets

(56) References Cited

U.S. PATENT DOCUMENTS

| | | |
|---|---|---|
| 2007/0169184 A1* | 7/2007 | Krywaniuk ......... H04L 63/0245 |
| | | 726/11 |
| 2007/0256122 A1 | 11/2007 | Foo et al. |
| 2008/0072324 A1* | 3/2008 | Repasi .................. G06F 21/566 |
| | | 726/23 |
| 2009/0293126 A1 | 11/2009 | Archer et al. |
| 2011/0083180 A1 | 4/2011 | Mashevsky |
| 2011/0219451 A1* | 9/2011 | McDougal ............ G06F 21/562 |
| | | 726/23 |
| 2012/0331306 A1 | 12/2012 | Harris |
| 2013/0081142 A1 | 3/2013 | McDougal |
| 2013/0145471 A1 | 6/2013 | Richard et al. |
| 2013/0239177 A1* | 9/2013 | Sigurdson ............ H04L 63/102 |
| | | 726/4 |
| 2014/0007238 A1* | 1/2014 | Magee .................. G06F 21/577 |
| | | 726/24 |
| 2014/0123295 A1 | 5/2014 | Brugger et al. |
| 2014/0195798 A1 | 7/2014 | Brugger et al. |
| 2016/0021139 A1* | 1/2016 | Stephan ................ G06F 21/552 |
| | | 726/1 |

* cited by examiner

FIG. 3A

| | |
|---|---|
| First seen as: f8b44825cb44297d993a7eab521d3f9d4c2f4923e1d59ce74669a7d4e2be7cf8 | File size: 729.98KB |

| AV Scan Results:10 | View Content | Raw Download | Encrypted Download |

MD5: a66c1ccad35e2825b4c0b4630062253b7

SHA1: 0e10261bd6f7f9e55cc10c479d9d49f6704315dfc

SHA256: f8b44825cb44297d993a7eab521d3f9d4c2f4923e1d59ce74669a7d4e2be7cf8

FIG. 3B

INQUEST

Antivirus Results

11 results for: { (file_cksum_id=572) }

| Scanned Time | Source | Scan Result | AV Engine | Version | AV Definition Date |
|---|---|---|---|---|---|
| 2015-10-23 14:14:44 | OPSWAT | Trojan (004cd2f1) | K7 scan engine | 1 | 2015-10-23 |
| 2015-10-23 14:14:44 | OPSWAT | a variant of MSIL/Kryptik.DHC trojan | ESET scan engine | 1 | 2015-10-23 |
| 2015-10-23 14:14:44 | OPSWAT | Atros2.AFjP | AVG scan engine | 1 | 2015-10-23 |
| 2015-10-23 14:14:44 | OPSWAT | Trojan.MSIL.Crypt | Ikarus scan engine(C.E) | 1 | 2015-10-23 |
| 2015-10-23 14:14:44 | OPSWAT | TR/Dropper.MSIL.213534 | Avira scan engine | 1 | 2015-10-23 |
| 2015-10-23 14:14:44 | OPSWAT | Artemis!F8E09882DC80 trojan | McAfee scan engine(C.E) | 1 | 2015-10-23 |
| 2015-10-23 14:14:44 | OPSWAT | Trojan.GenericKD.2813616 | F-secure scan engine(C.E) | 1 | 2015-10-23 |
| 2015-10-23 14:14:44 | OPSWAT | Trojan.GenericKD.2813616 | Lavasoft scan engine(C.E) | 1 | 2015-10-23 |
| 2015-10-23 14:14:44 | OPSWAT | Trojan.GenericKD.2813616 | BitDefender scan engine | 1 | 2015-10-23 |
| 2015-10-23 14:14:44 | OPSWAT | Trojan:Win32/Dynamer!ac | Microsoft Security Essentials (C.E) | 1 | 2015-10-23 |

- Scan/Rescan:
  - Adhoc on-demand scanning
  - Uses scanning resources at the time of submission
  - Vendor product info and corresponding alerts
  - Populates scan reports for a file using latest configurations
  - Updated scan reports become available in the search results

| EventID | Category | Name | Confidence | Severity | Actions |
|---|---|---|---|---|---|
| 10000020 | FileID > Microsoft >CHM | Compiled Help File | 10 | 0 | View Signature |
| 10000001 | FileID > Microsoft | Rich Text Format File | 10 | 0 | View Signature |
| 10000002 | FileID > Adobe>Flash | Adobe Flash File | 10 | 0 | View Signature |
| 10000003 | FileID > Microsoft >Office | Microsoft Office Document | 10 | 0 | View Signature |
| 10000004 | FileID > Microsoft >Office | Microsoft Office 2007 Document | 10 | 0 | View Signature |
| 10000005 | FileID > Microsoft >Excel | Microsoft Excel Document | 10 | 0 | View Signature |
| 10000006 | FileID > Microsoft >Word | Microsoft Word Document | 10 | 0 | View Signature |
| 10000007 | FileID > Microsoft >PowerPoint | Microsoft PowerPoint Document | 10 | 0 | View Signature |
| 10000008 | FileID > Adobe >PDF | Adobe PDF | 10 | 0 | View Signature |
| 10000009 | FileID > Archive>ZIP | Zip Archive | 10 | 0 | View Signature |
| 10000010 | FileID > Microsoft >Link | LNK Shortcut File | 10 | 0 | View Signature |
| 10000013 | FileID > Archive >JAR | Java Archive | 10 | 0 | View Signature |
| 10000014 | FileID > Archive >EXE | Zip Containing COM File | 10 | 0 | View Signature |
| 10000015 | FileID > Archive | 7zip Archive | 10 | 0 | View Signature |
| 10000016 | FileID > Embedded Content>EXE | Windows Executable File | 10 | 0 | View Signature |
| 10000017 | FileID | ELF Binary | 10 | 0 | View Signature |

FIG. 17

INTEGRATED NETWORK THREAT ANALYSIS

RELATED APPLICATION

This application is a continuation-in-part of application Ser. No. 14/201,762, filed Mar. 7, 2014, now U.S. Pat. No. 9,313,217, which claims the benefit of U.S. Provisional Application Ser. No. 61/774,576, filed on Mar. 7, 2013, the contents of each of which are hereby incorporated by reference.

FIELD OF THE INVENTION

The present invention relates generally to techniques for associating network threats with the specific streams in which the network threats are detected.

BACKGROUND OF THE INVENTION

There are several challenges facing modern signature-based network intrusion detection systems that impede their ability to detect malicious content. Transport mechanisms for protocols like SMTP (Simple Mail Transfer Protocol) and HTTP (Hypertext Transfer Protocol) involve encoding, encryption and compression. Host-based file analysis tools, such as anti-virus (AV) systems, typically do not provide alerting information showing transport origination. Similarly, network intrusion detection systems (IDS) don't normally provide file information such as message digests, file size, or decoded content. These shortcomings in existing systems impair the ability of system administrators to defend networks from malicious content.

BRIEF DESCRIPTION OF THE DRAWINGS

FIGS. 3A and 3B illustrate an example user interfaces for functions associated with the threat analysis system.

FIG. 5 illustrates an example user interface for functions associated with the threat analysis system.

FIG. 6 illustrates an example user interface for functions associated with the threat analysis system.

FIGS. 7A and 7B illustrate example user interfaces for functions associated with the threat analysis system.

FIG. 12 illustrates an example user interface for functions associated with the threat analysis system.

FIG. 13 illustrates an example user interface for functions associated with the threat analysis system.

Figure 17:
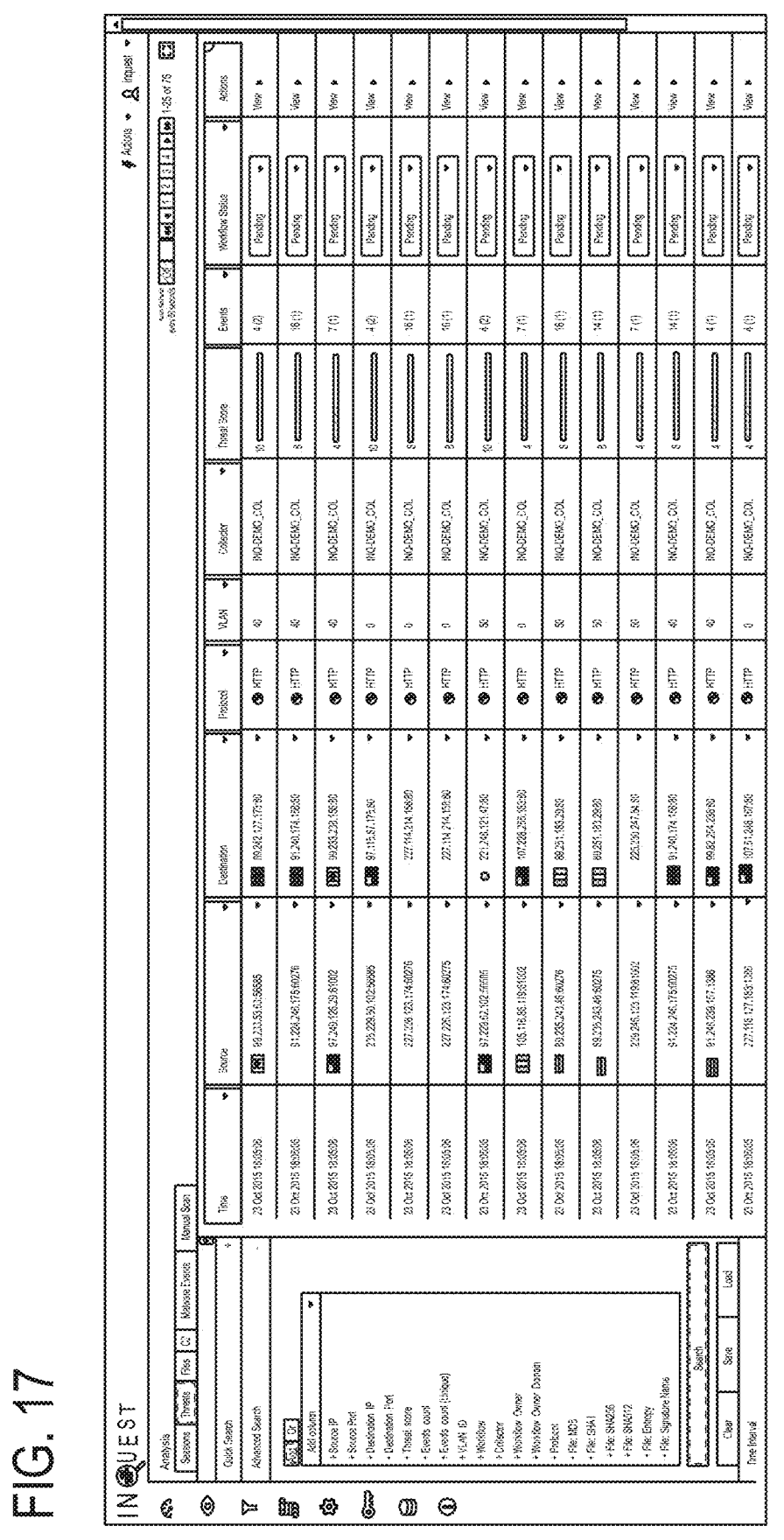

FIG. 17 illustrates an example user interface for functions associated with the threat analysis system.

DETAILED DESCRIPTION

The invention addresses these shortcomings of existing systems by identifying, decoding, decompressing, and performing user specified functions on files prior to executing signature-based detection routines. This system then aggregates network information to accompany file information in an indicator and warning environment. This system also provides a user interface to search for files using network attributes, threat attributes or file attributes, such as message digests. Examples of search options are illustrated in FIGS. 7A-8B.

As non-limiting examples, the system described herein can use LibNIDS to perform TCP stream reassembly, various Perl and/or Python modules for decoding data such as HTTP and SMTP messages, and signature-based detection engines, such as YARA. While examples are provided with respect to YARA and other tools, these tools are provided as examples only and the systems and methods described herein can be implemented using other tools and can operate on other types of data.

Components and Data Flow

The system can comprise several components that execute as separate processes to, as non-limiting examples: reassemble TCP streams, decode message and/or file content, scan files, communicate with third party devices, log alerts associated with file content, and generate messages for security information and event management (STEM) systems.

Figure 1:
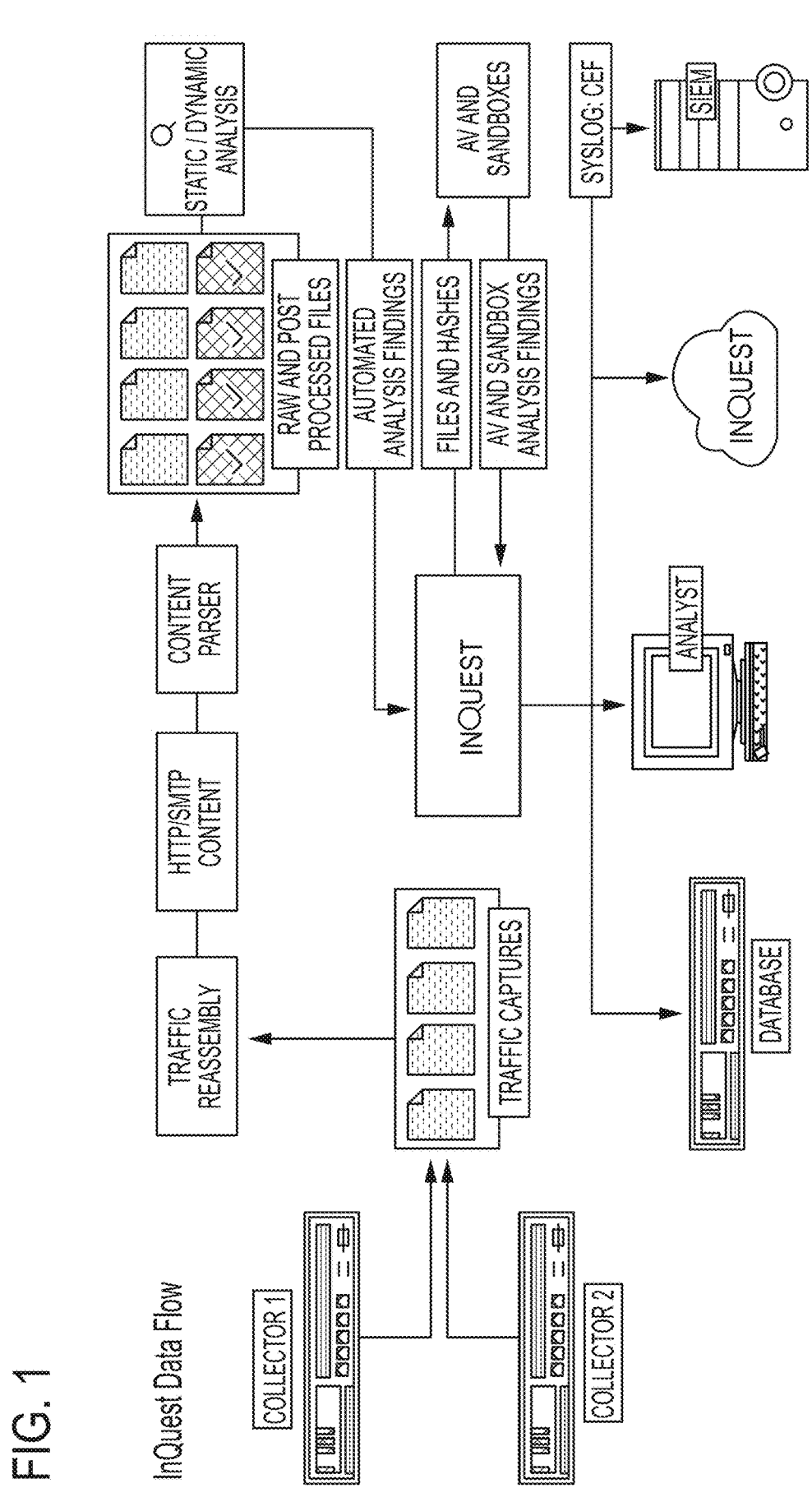
FIG. 1 illustrates an example system architecture for associating network threats with data streams.
Figure 2A:
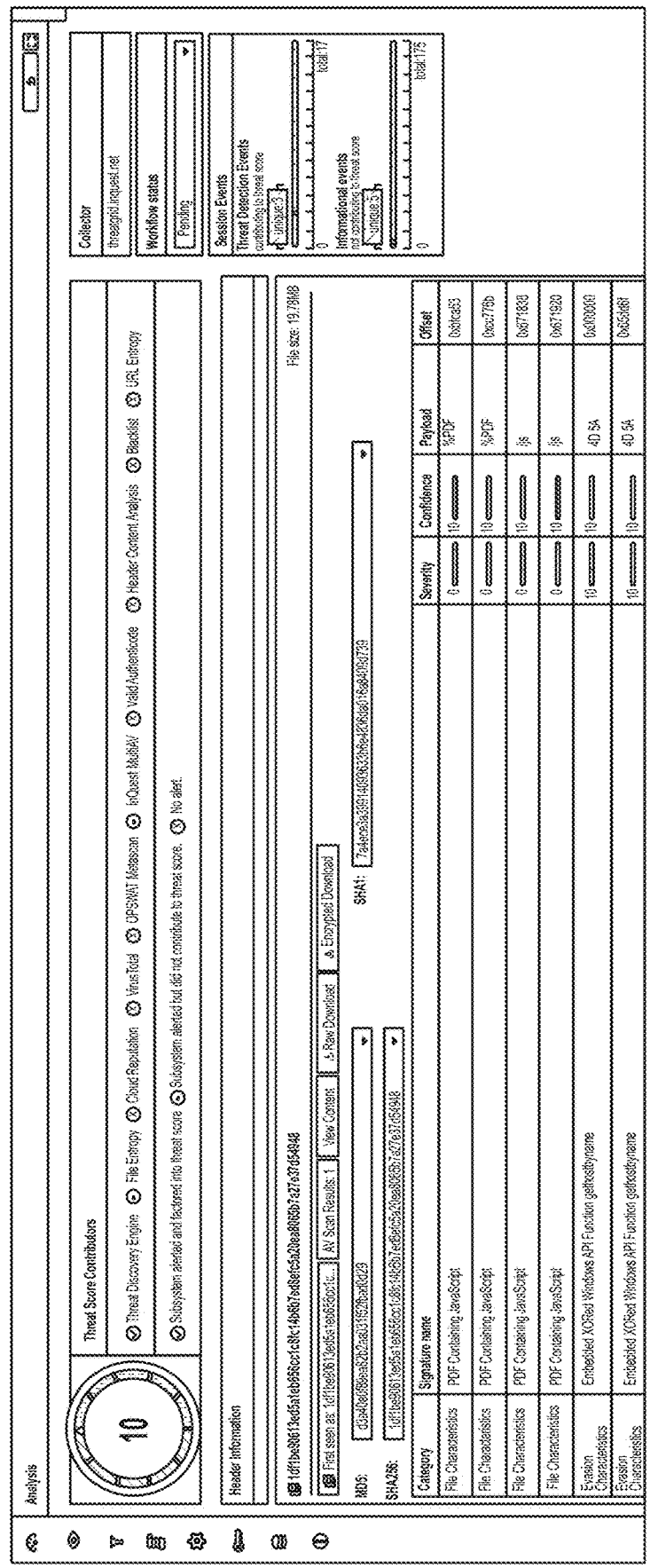
FIGS. 2A and 2B illustrate example user interfaces for functions associated with the threat analysis system.
Figure 2B:
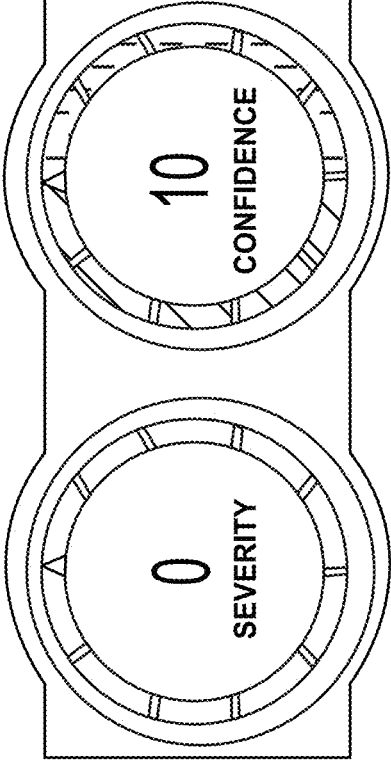

Example components of the system and their interrelationships are illustrated in FIG. 1.

Functional Overview

The system can be configured to perform functions, which can include:

Identify, inspect and execute files received via e-mail or downloaded over the web to detect malware being delivered to end users;

Analyze HTTP Header fields (URIs, Referers, etc.) for suspicious and/or malicious content Analyze and execute hyperlinks embedded within emails to determine if the link leads to a site and/or file that is malicious;

Detect command and control communications (C2) by identifying attempted or established connections to a C2 IP address or an attempt to resolve a C2 domain name through local DNS;

Compensate for network-based and host-based security systems' inability to detect malware within their computing environments;

Catalog, report and trend network session, file and threat data of email and web connections;

Search for e-mail and web content;

Search for command and control communications (C2);

Automate analytic techniques used for malware detection, including post-processing of file formats;

Automate malware analysis through multiple static and dynamic analysis methods;

Integrate with SIMs/SIEMs, including logging and alerting, and API integration to expedite file analysis and logging.

Integrate with MultiAV and Sandbox systems, including logging and alerting, and API integration to expedite file analysis and logging.

Data Capture

One or more modules can be configured to process and analyze data including, for example, email and web content according to a predetermined schedule. While the examples described herein use email and web content, other types and formats of data could be processed and analyzed using the described systems and methods.

The systems and methods described herein can be used to store data from email and web sessions, including but not limited to: TCP/IP session information, email and web header information, original files, post-processed files (uncompressed, decoded, etc.), and/or file hashes.

The system can be configured to capture TCP packet data using any one or combination of methods. As one non-limiting example, packet data can be captured using an available library such as libpcap. Alternatively, packet data may be captured using third-party commercially available tools or packet capture devices, including full packet capture devices. As non-limiting examples, packet capture devices used could be those produced by Niksun, Solera, Sniffer, or RSA NetWitness. Packet data may also be captured natively in the system using an open source tool, such as tcpdump. The captured packet data can then be exported in pcap or another format for further processing via scp, sshfs, or another suitable protocol.

The captured packet data, from any source, can be input to a stream capture tool, such as LibNIDS. TCP streams can be read by LibNIDS, which can be used to monitor the state of the connections and reassemble packets into the correct order as they arrive. When LibNIDS indicates a TCP stream is finished, reset, or timed-out, the TCP stream is passed to a module responsible for parsing that protocol, extracting the network session information and saving associated files, such as e-mail attachments or files from HTTP servers to electronic data storage.

These processes can be used to improve system performance by evaluating the size of messages (e.g., e-mail and HTTP sessions) and file types before committing resources and time saving files and logging metadata to a database. The system can track the message digests of files saved, so that when files are received multiple times, those instances are logged, but the files are not resaved. After a file and its message and transport information are stored in the database, post-processing queues can be populated. Those queues inform the different modules in subsequent phases that those files are to be processed.

As non-limiting examples, these processes can be carried out by programs and/or modules configured to track information about TCP sessions and hold reassembled streams. For HTTP sessions, the system can be configured to parse HTTP requests/responses, decode content, save files, and initiate database logging routines to store information about the TCP stream, message attributes, and file information. For SMTP sessions, the system can be configured to parse SMTP messages, decode content, save files, extract embedded links and initiate database logging routines to store information about the TCP stream, message attributes, embedded links and file information.

Programs used in processing can be configured to use a module to interface with a backend database. As a non-limiting example, the database module can be a collection of functions responsible for storing information about TCP streams, protocol message and entities attributes, and file information. This primary cataloging system can determine how files are stored and whether they are saved.

The system can be configured to analyze the captured data to detect command and control (C2) activity based on connections identified at the data collection interface. Monitored parameters can include nameserver lookups of known C2 domains as well as connection attempts to known C2 Internet Protocol (IP) addresses.

The system can be configured so that, at any point, captured data can be filtered to improve performance. For example, hashes of known legitimate files can be filtered out and/or particular MIME types can be filtered out.

Post Processing and File Analysis

The systems and methods can include file scanning functionality, including any of static and/or dynamic analysis, and anti-virus scanning, and well as reporting and statistics.

The modules can be configured to process and/or analyze captured files and execute scans on those files, including anti-virus scans. The results can be stored in a computerized database. Analytical results for network sessions and files can also be stored and made searchable through a web front-end. Example file analysis data is illustrated in FIGS. 2A-3B.

Files can be scanned and/or rescanned. Scanning can include:

1. Modules configured to utilize multiple sources to detect and generate alerts;

2. Files are initially scanned and then can be rescanned on-demand or automatically through the Vintage module when new signatures are added;

3. Scan/re-scan can be configured to force the file to be scanned by some or all of the resources available. The scan/rescan function can be configured to process the file saved by the system, or a hash of the file, against one or more internal and external resources. Individual resources can be selected for manual file uploads.

Figure 4:
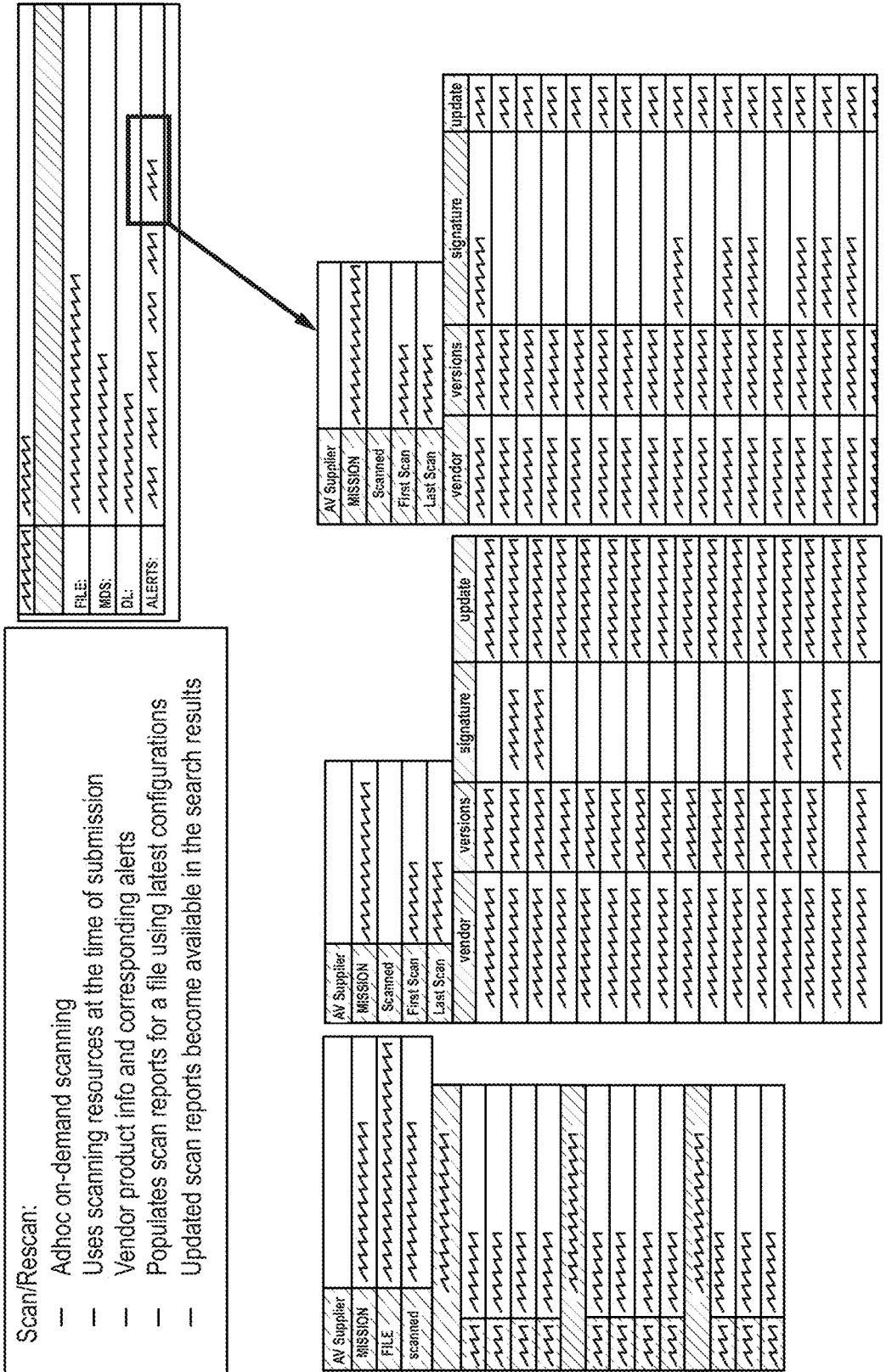
FIG. 4 illustrates an example user interface for functions associated with the threat analysis system.
Figure 7A:
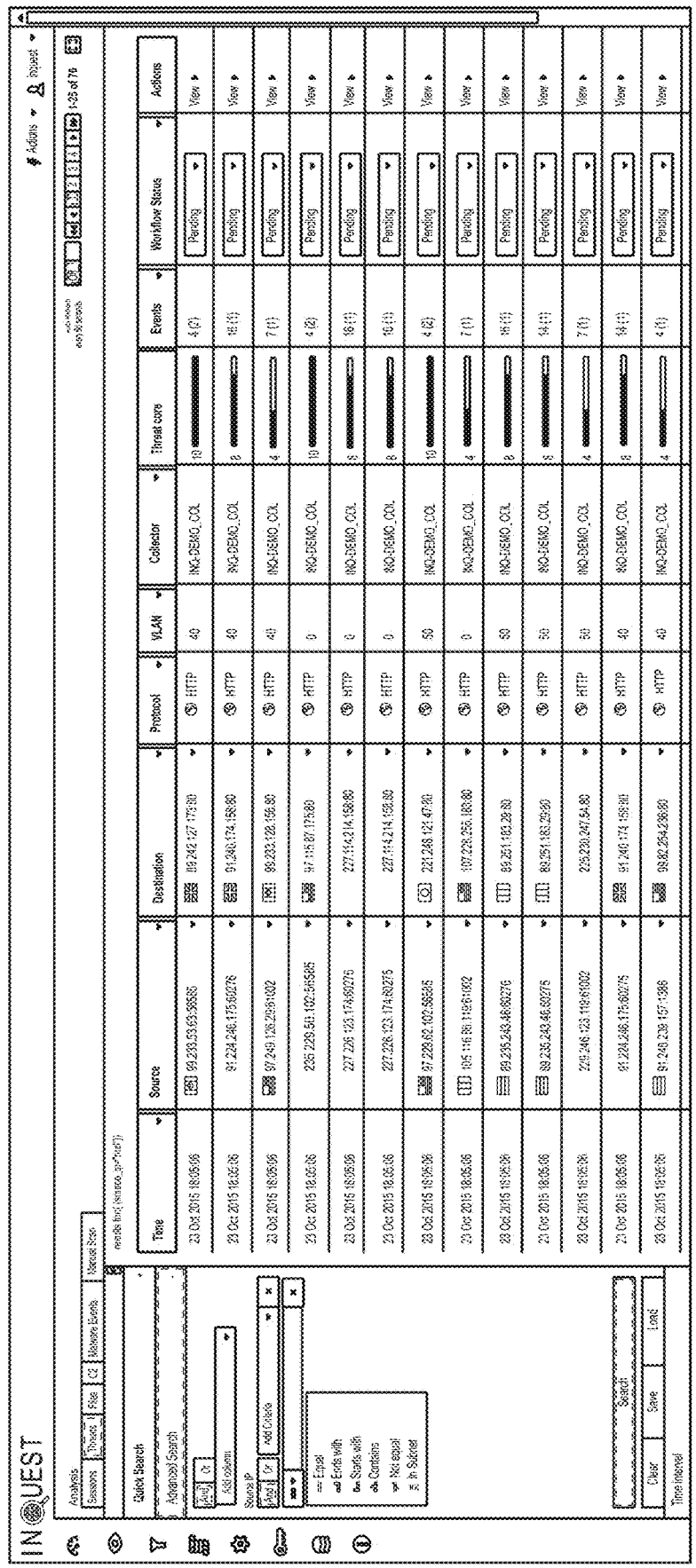

Example file scan parameters are illustrated in FIG. 4. Some of the parameters can include variables, payload, strings and offsets, virus scan results, signatures, and date stamps.

File analysis can include routines that are initiated after files have been saved to a computerized data storage device and file information has been logged to the backend database. These routines are referred to as post-processors, because they can be executed after TCP stream reassembly and files have been saved. The post-processors can retrieve files from post-process queues in the order that they were created and perform a variety of data manipulation and analysis functions to render data in files available to the signature-based mechanisms. Example analysis features are further illustrated in FIGS. 2-4.

Similar challenges presented to a signature-based detection system by files in transit are also encountered in the files themselves. As a non-limiting example, a PDF may have been downloaded over the web with specific transfer encodings which are decoded before it was saved that may require additional parsing before being scanned by the signature-based scanner. File formats, such as PDFs, contain embedded compressed streams which can be individually decompressed so that signature matches have complete visibility of the file contents and can be determined.

Data manipulation components can be configured to perform data manipulation on file streams to prepare them for signature-based scans with YARA, or another tool having similar features. Post-processing and scanning can be performed by executing signature-based scans on files and post-processed files (manipulated versions of original files), aggregating those alerts, and binding the results of those scans to one or more file records. These components can also generate messages for security information and event management (STEM) systems. New scans can be executed on files which have not been scanned before or which were scanned using a rule set which has been updated since it was last scanned. Saved scan alerts can be retrieved for files which were previously scanned using a recent signature configuration.

Post processing can also include executing routines on files that involve third-party APIs. As a non-limiting examples, file hashes can be submitted to third-party scanning systems using the APIs for those systems. Results from the submissions can then be processed, recorded, and sent to a STEM via syslog. Various third-party resources can be utilized. As non-limiting examples of third-party resources, anti-virus functionality could be performed using VirusTotal and sandboxing could be performed using FireEye. Some third-party resources can be accessed and recorded at different rates.

Network session characteristics (domains, IPs, etc.) or file attributes (name, hash, etc.) extracted from threats identified through internal or external analysis can be submitted to third-party active prevention systems (Intrusion Prevention Systems) using the APIs for those systems for active network blocking of the content.

Some embodiments can include modules configured to utilize third-party resources to analyze files. Anti-virus APIs can be used to scan files and the output can be stored and alerts sent to the SIEM. Post-processing can also include deep file analysis for the various file types.

Files can be stored to computerized storage media after being decoded. At that point, a process that runs independent of the collection modules can mark the files for post processing through, for example, selection in a MySQL table. The type of file can be determined through, for example, libmagic, a common Linux library that inspects values of the file stream to determine the file-type, and that file-type determination can then be used to inform the routines that are executed on that file. The result of the routines can be an alternate version of the file that can be used for signature based analysis.

Binding file types to functions allows creation of the routines which can be used to properly parse data for file-types so that signatures can be developed for content in a file that would otherwise be encoded, compressed, or unsuitable for signature-based detection methods.

For binding filetypes to sub-routines, anonymous subroutines are declared for specific mime-types. The file post-processor has the file data stored in a variable, and determines which, if any, of the subroutines are to be executed to create a new post-processed version of the file. Similar subroutines can be declared for other file types to include but not limited to picture files (such as JPG, GIF, PNG), executables, image files (such as ISO), and ROM files.

The difference between the original version of the file and the post-processed version of the file can depend on the file type. A file that has a mime-type of 'zip' can undergo execution by the post processing subroutine for zip type files which can read the archive members, determine those file-types, execute post-processing functions, if available, on an embedded file, and write the uncompressed file data of the archive contents and post-processed archive contents to one or more file streams which can be scanned by a tool, such as YARA. Using the original file and the post-processed version of the file and its contents, the file content can be inspected with signatures, such as with YARA, that may otherwise be impossible due to compression.

In some embodiments, one file saved by the system can result in one post-processed file. The output stream of recursive post-processing functions on some types, such as zip, whose members may also have functions that can be performed, can also be written in one file despite the level of recursion.

As a result, the original zip file contents can then be flagged by signature-based analysis because they have undergone post processing and also had their data written to the post-processed file stream. File post-processing can be configured to produce as few as one file despite situations where the file being post-processed may be an archive with many members. In other embodiments the system can be set to save multiple post-processed files for specific analysis.

The system can include a module configured for post-processing data decompression. In some cases, signature-based analysis cannot be performed on compressed streams. In some cases, there may be an exception for file headers.

As an example of file post-processing, routines can be executed on PDF file-streams. The routine maps to the anonymous subroutine for post processed subroutine for PDFs and the post processed PDF file is a data stream file that can be analyzed. As a result, when the file contents are evaluated by the file post-processor libmagic and declared as "application/pdf", its post processed data stream can be the result of the function for post processing PDF files. The PDF file format is a binary format with multiple containers of data that are in some instances simply compressed streams. Those compressed streams can contain any type of arbitrary data, such as JavaScript, which is a common attack vector used in malware. While the embedded objects may be in unreadable or compressed form, in some cases, it may not be possible to perform signature-based analysis against the content of those objects.

Figure 5:
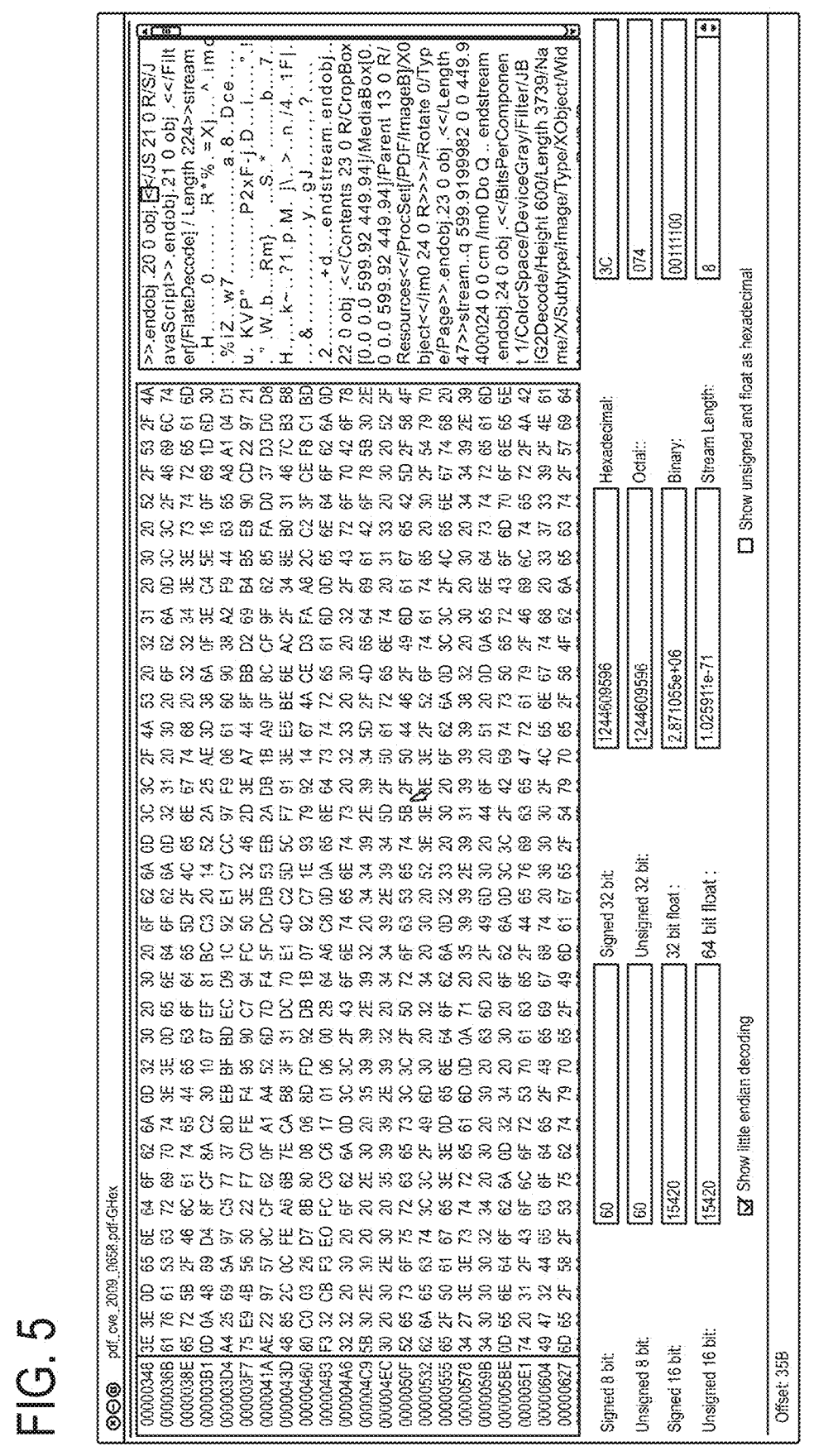

When constructing a function that can decompress embedded streams within the Portable Document Format, specific areas of the binary may be recreated so that they are presented in a way that is conducive to signature analysis for malicious content that can be present in those embedded strings. FIG. 5 illustrates an example result of file post-processing for a PDF file. It illustrates one embedded compressed stream (ORIGINAL PDF FILE) which was then decompressed and written in the post-processed version (POST-PROCESSED PDF FILE) of the file. Note the readability of the data in container 21 within the JS object in the POST-PROCESSED file as displayed in FIG. 5.

Figure 6:
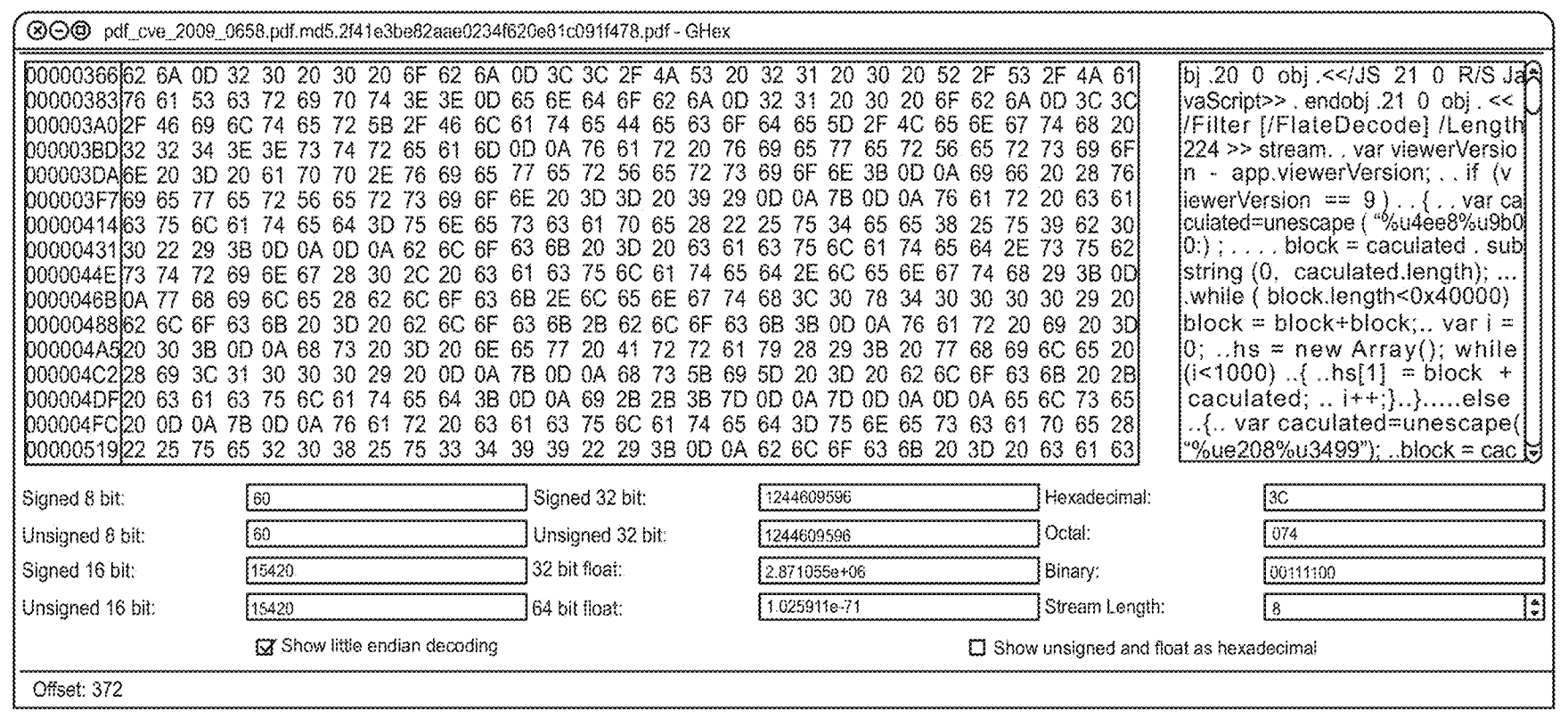

FIG. 6 illustrates an example result of the post-processing operation. The post-processing routines can be as complex as needed. Procedures can be bound to file-types to provide a mechanism to inspect the file contents with effective signatures on file-types which are not always subject to signature-based analysis. Both the original and post-processed files can be scanned with YARA, or a similar tool, and the aggregated alerts can be stored as the file's aggregated list of associated alerts. The result is a list of signature alerts from which indicators and warnings can be assessed.

Threat Scoring

The system can include threat scoring functionality that can be configured to calculate a threat score based on a combination of the result of file analysis on one or more files and associated network data capture information. In some embodiments, the score can be a single number, such as an integer within a bounded range, and can be based on one or more outputs generated by internal and/or external sources. Individual and/or groups of data can be weighted and a scaled risk score can be derived. Components of the weighted score can also be sub-weighted.

Threat Scoring—Internal Sources

As non-limiting examples, internal sources of factors for scoring can include:

Static analysis results including (each of which can have their own sub-weight): number of alerts generated, severity of alert generated, is CVE identified by alert, is CVE patched or unpatched, timeframe since signature was created/updated, and/or YARA signature matches;

File entropy (randomness of the whole file or certain sections of the file);

File characteristics (to include type, size, and file name);

File uniqueness (how many times has the file been identified on the network);

Fuzzy hashing (determine similarity between two different file items)

Anti-virus scan results from an internal scan (results from each individual anti-virus engine can be sub-weighted based on the reliability, false positive rate, false negative rate, etc. associated with the engine);

IP/domain/hash reputation: For example, is the IP, domain, or hash associated with the file known for hosting or sending malware; and/or Dynamic analysis results.

Threat Scoring—External Sources

As non-limiting examples, external sources of factors for scoring can include:

Anti-virus scan results from an external scan: For example, OPSWAT, VirusTotal, etc. (results from individual anti-virus engines can be weighted based on reliability, false positive rate, false negative rate, etc. associated with the engine); and/or Sandbox Results: For example, GFI Sandbox, FireEye, etc. (results from sandbox analyses can be weighted based on reliability, false positive rate, false negative rate, etc.).

Data Processing Parameters—Web

Example supported file types can include, but are not limited to: SWF, JAR, CHM, DOC, DOCM, DOCX, EMF, EXE, MDB, PDF, PPS, PPSM, PPT, PPTM, PPTX, WMF, WRI, XLS, XLSM, XLSX, ZIP TCP stream size requirements can be arbitrarily set.

TCP state requirements can optionally require that incomplete TCP sessions be discarded.

Outbound requests and/or inbound responses can be captured and analyzed.

Data Processing Parameters—Email

The system can be configured so that when an email is received for a user covered by the system, the system can extract any hyperlinks to websites contained within the body of the email and perform one or more analyses of those links within the email. The analysis of a link within the email can include some or all of: domain reputation checking, automated file retrieval (if the link is to a file) and analysis of the file, monitoring the network traffic for internal users clicking on the link and visiting the site that was in the email for further analysis, including the extracted link in a syslog or other message generated, and sending the link or an address identified in the link to a third-party integrator for further correlation.

Example supported file types can include, but are not limited to: CHM, DOC, DOCM, DOCX, EMF, EXE, MDB, PDF, PPS, PPSM, PPT, PPTM, PPTX, WMF, WRI, XLS, XLSM, XLSX, ZIP TCP state requirements can optionally require that incomplete TCP sessions can be discarded.

Message Truncation. In some embodiments, messages not ending in <CRLF>. <CRLF> may be discarded.

The system can operate on plaintext messages (unencrypted) as well as encrypted messages where decryption keys are made available. In some embodiments, decryption can be performed by a separate decryption device or service and the decrypted content provided to the system.

The systems and methods can be RFC2045 (MIME) compliant.

Inbound messages and outbound replies can be captured and analyzed.

Database and Repository

The systems can be designed to facilitate rapid data retrieval and provide mechanisms for reducing file storage requirements while increasing data retention (retaining records back to a specified date). The system can store data descriptive of files received and then associate that data with scan results and archived records of malicious files stored in a malware library.

As non-limiting examples, the database can be designed to store information covering: TCP sessions, selected message fields from SMTP and HTTP, files paths, size hashes, file-types, instances of files received through a TCP session, file-alerts produced by YARA or other third-party appliances, libraries and/or modules, and/or process queues for file scans.

In the course of collecting, storing, and retrieving information certain table relationships exist to facilitate the portrayal of TCP sessions, attributes, within those sessions, and the content of those sessions. Content related to sessions could be files and alerts stored about the files.

The three primary groups of information pertain to either TCP sessions, SMTP headers and HTTP request and response headers, files, and scanning and alerting.

Files stored are uniquely recorded and future instances of receipt can refer to existing records. The impact of that normalized design provides the opportunity to map new TCP sessions to existing resources and reduce the need to store new files and records about the files. A lookup table bridges sessions and files. It has foreign keys in other normalized tables and is used to pull unique information such as protocol, mime types, attached files, protocols, and file names given to files transmitted in particular TCP sessions.

Message and file headers are uniquely stored by field name and value so that duplicates of header and header value are never produced more than once. For example, an email from me@there.com will be recorded once, and future headers where a "from" field has a value of me@there.com will be recognized and reference by an identifier that is bound to the pair. This can reduce the storage requirements for message headers.

Scanning resources and alerts can be performed with YARA and antivirus engines. YARA tables can be used to track both the configurations used to scan files and scans performed on files. The configuration and contents of a configuration can be retrieved for a particular run on a file based on integrity checking mechanisms in the application which monitor and record changes made to rules.

Antivirus tables can store instances of scans on files providing a historic record of scans and antivirus alerts for each file. When antivirus alerts are associated with a file, they are mapped to a specific scan so that alerts yielded by future scans are differentiated whenever a scan is performed.

Normalization of antivirus engines and alerts is demonstrated by storing engine names and their respective alert names uniquely in separate tables thereby increasing data retention and creating an efficient selection pool of alerts regarding scans, engines, and alerts.

Configuration information is also stored about engines pertaining to an engine's modification date. This information is used to determine whether a file requires a new scan or not. If the configuration date for an antivirus engine is current, resources requiring alerts for the file will receive the last scan report, otherwise a new scan can be performed, its alerts saved, and provided to the resource that requires it.

The normalization of file and alert information involved is a result of file record normalization and normalization of scans on files and scan resources. It reduces the number of records that are stores, resources required to produce records (scans), and provides a historic alert history when a specific file is received.

Database Queries

The database can be designed to allow queries of files with specific MD5, SHA1 or SHA256 hashes to return information about the file as well as associated TCP sessions, protocol message data, and alerts for instances of receipt for that file. This can be accomplished, for example, through the joins bound to the look-up table 'session_file'. Any information that is stored can be queried given any attribute provided. For example, a user could look up the TCP sessions for files on a certain day with a specific mime/type. Or a user could retrieve the number of YARA alerts for a specific signature on a certain day for alerts from a specific IP. These queries are enabled as a result of the system's normalization of TCP session information and file information. While the GUI need not be specifically designed to provide these options, the arrangement of keys and normalization is capable of providing such results through SQL and through a GUI interface.

The schema of each foreign key relationship is denoted by [foreign_table_key_name]_id. For example, table session_file is bound to table 'session' by the id in the field session_file.session_id. This allows for a query for files bound to a TCP session. Alternatively, a user could also obtain the TCP session information for a file given file attributes, such as an md5sum which is also a foreign key to 'session_file' identified by session_file.file_cksum_id whose hash value resides in table file_cksum.

When a file is saved for the first time to a storage device, a record is created in the file_cksum table with details about its location, size and message digest. A subsequent receipt of that file does not need to be stored in the file_cksum table, but rather an instance in the session_file table which has a many-to-one relationship with table file_cksum can be used. Having the unique or substantially unique file information for files received means that if a certain file is saved to a computerized data storage device once, then future instances of receipt of that file can refer to the first instance stored. While future instances of receipt may involve different TCP session, name or protocol information, that information can be represented in table session_file. Saving files once can reduce processing time for writing files to storage devices and for identifying whether scans with an updated scan configurations need to be performed on that particular file regardless of how it was received or what its name was when it was received.

Handling Volume

The systems and methods can be configured, with HTTP for example, to select from which requests and responses to parse and extract files. During collection, as packet streams are being read sequentially, the system can examine responses and compare the header of the response to a specific list of known values (file header identifiers). If one or more matches are seen, the TCP stream can be sent to a callback function which isolates and decodes the request and response to determine which part of the conversation is to be stored.

If, during collection, the content is, for example, compressed and no matches are able to be determined, the stream can be passed to the callback function for further decoding to determine whether files of interest (designated by the system configuration) exist after decompression or decoding. Narrowing down the types of content to be stored can provide performance gains, while allowing the user to focus on specific file types.

Search Features

Figure 7B:
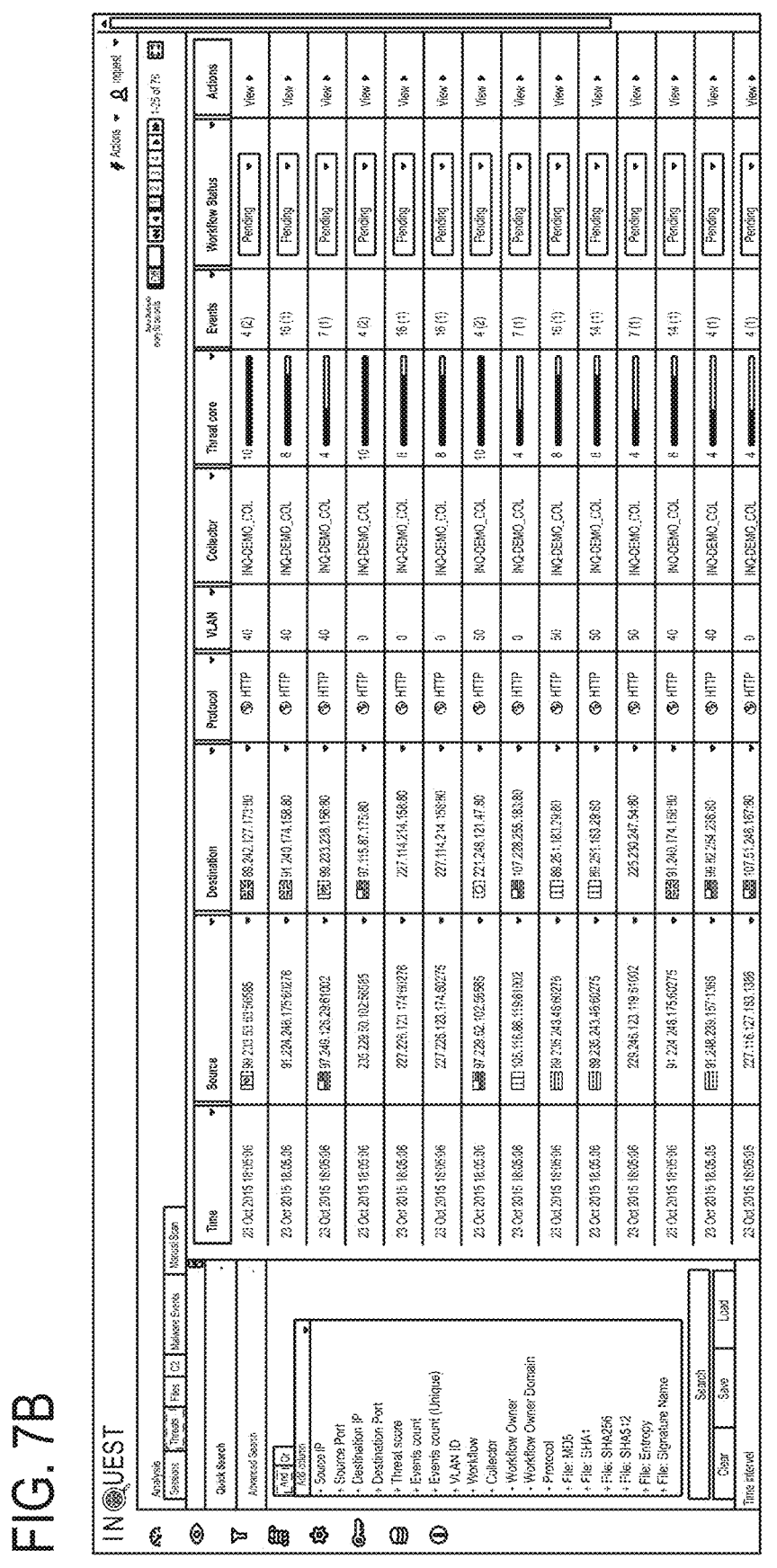
Figure 8A:
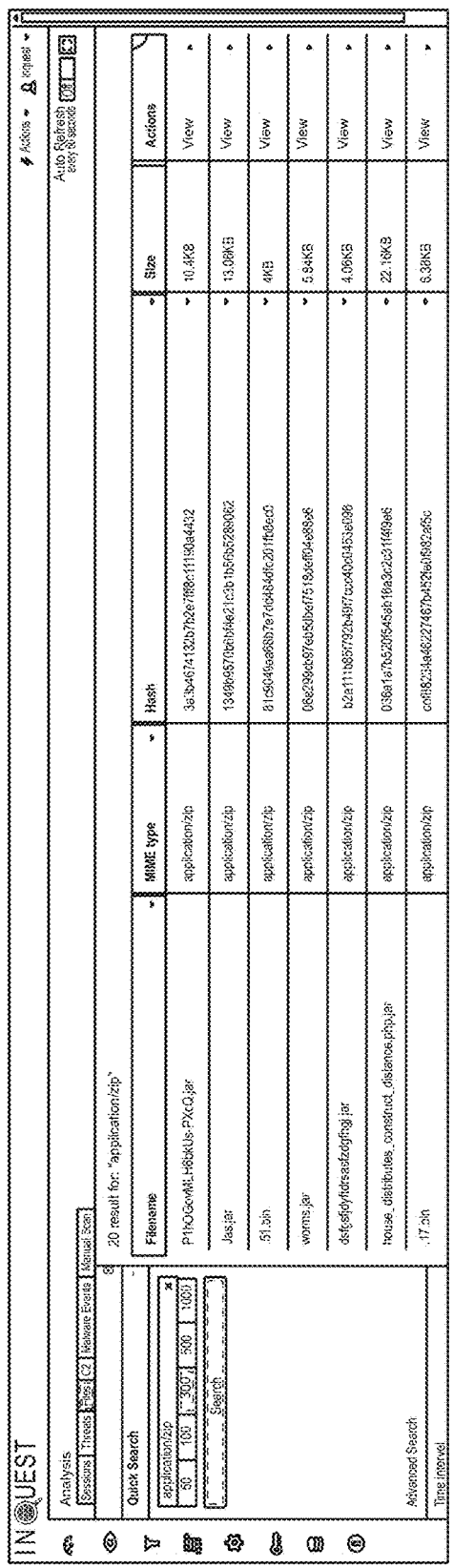
FIGS. 8A and 8B illustrate example user interfaces for functions associated with the threat analysis system.
Figure 8B:
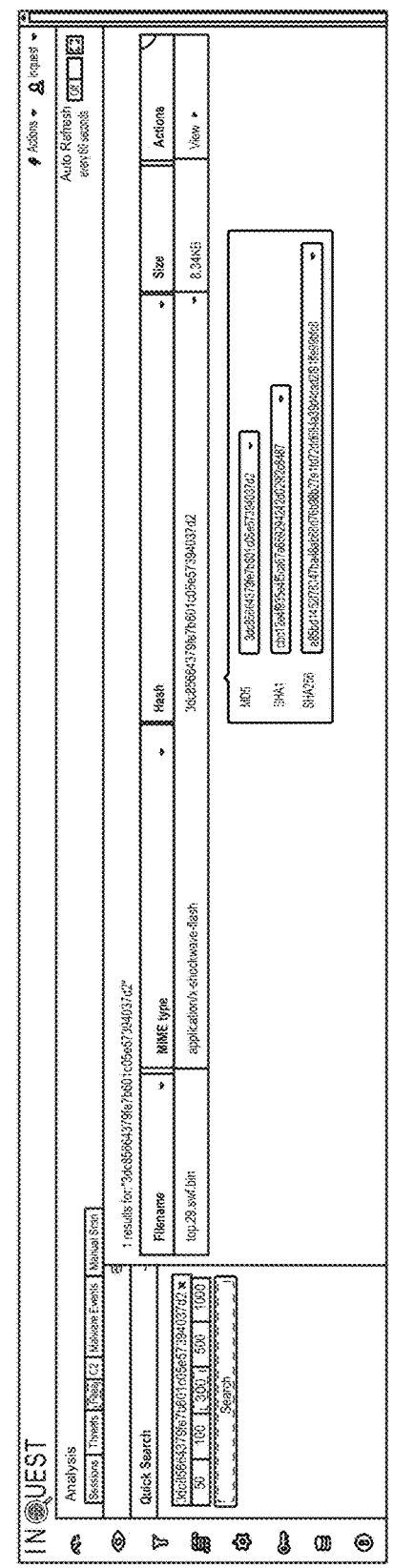
Figure 9:
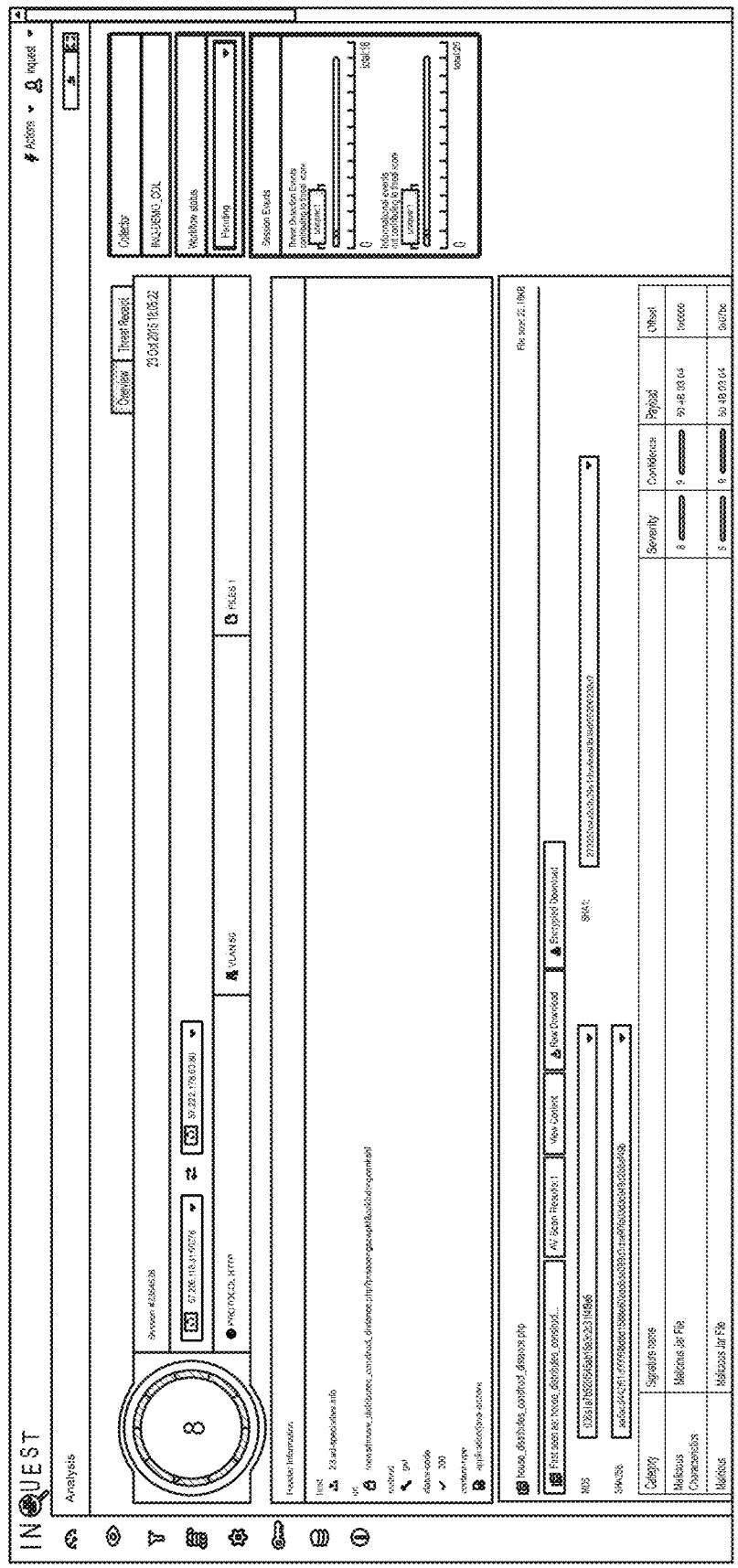
FIG. 9 illustrates an example user interface for functions associated with the threat analysis system.

Example features for executing search queries on the system are illustrated in FIGS. 7-8. Search features can be designed to expedite searches by message, file attributes, hash, source or destination over HTTP, SMTP or both.

Statistics

The system can be configured to collect various types of statistics. File collection statistics can include file types, including a breakdown of files received over email or web.

Figure 10:
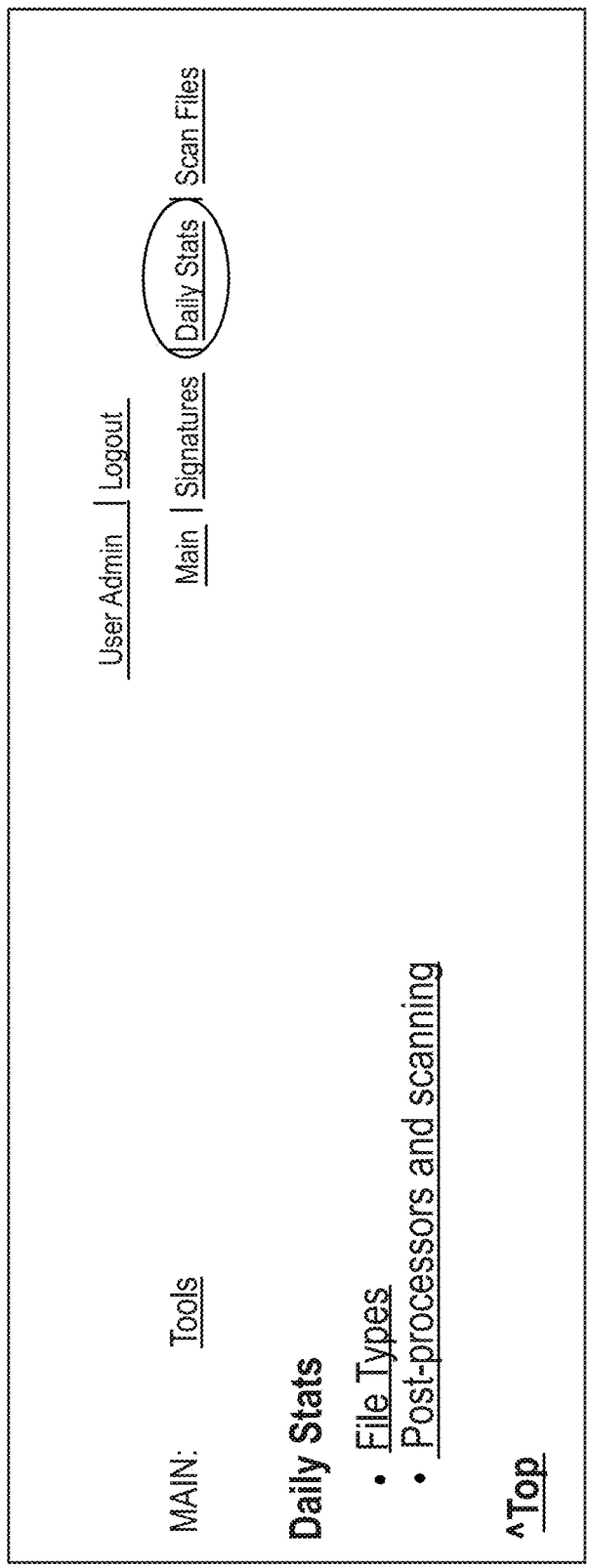
FIG. 10 illustrates an example user interface for functions associated with the threat analysis system.

File scan statistics can include post-processors and scanning including showing the number of files scanned per hour on a given day. An interface for accessing statistics is illustrated in FIG. 10.

Figure 11:
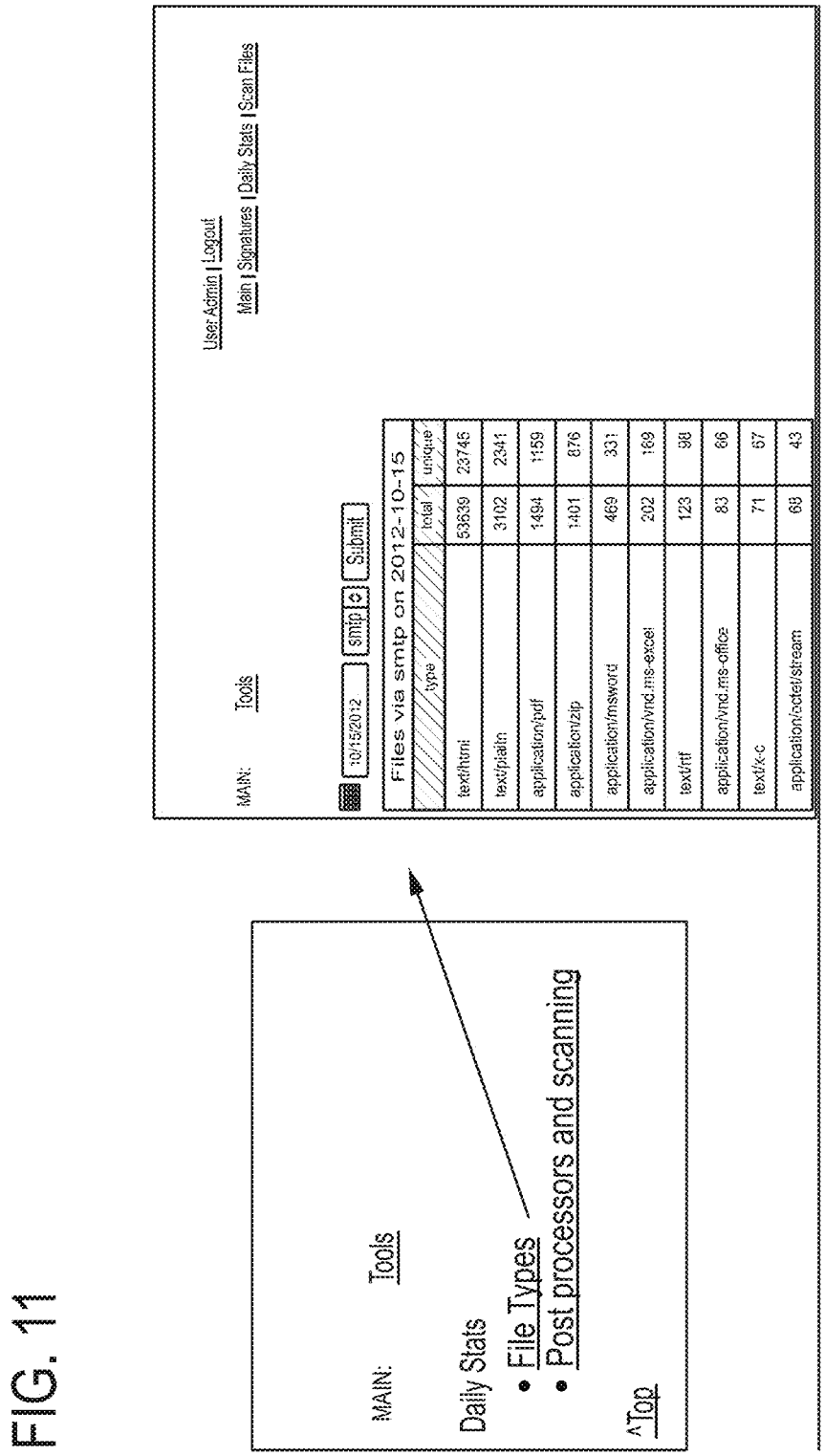
FIG. 11 illustrates an example user interface for functions associated with the threat analysis system.
Figure 14:
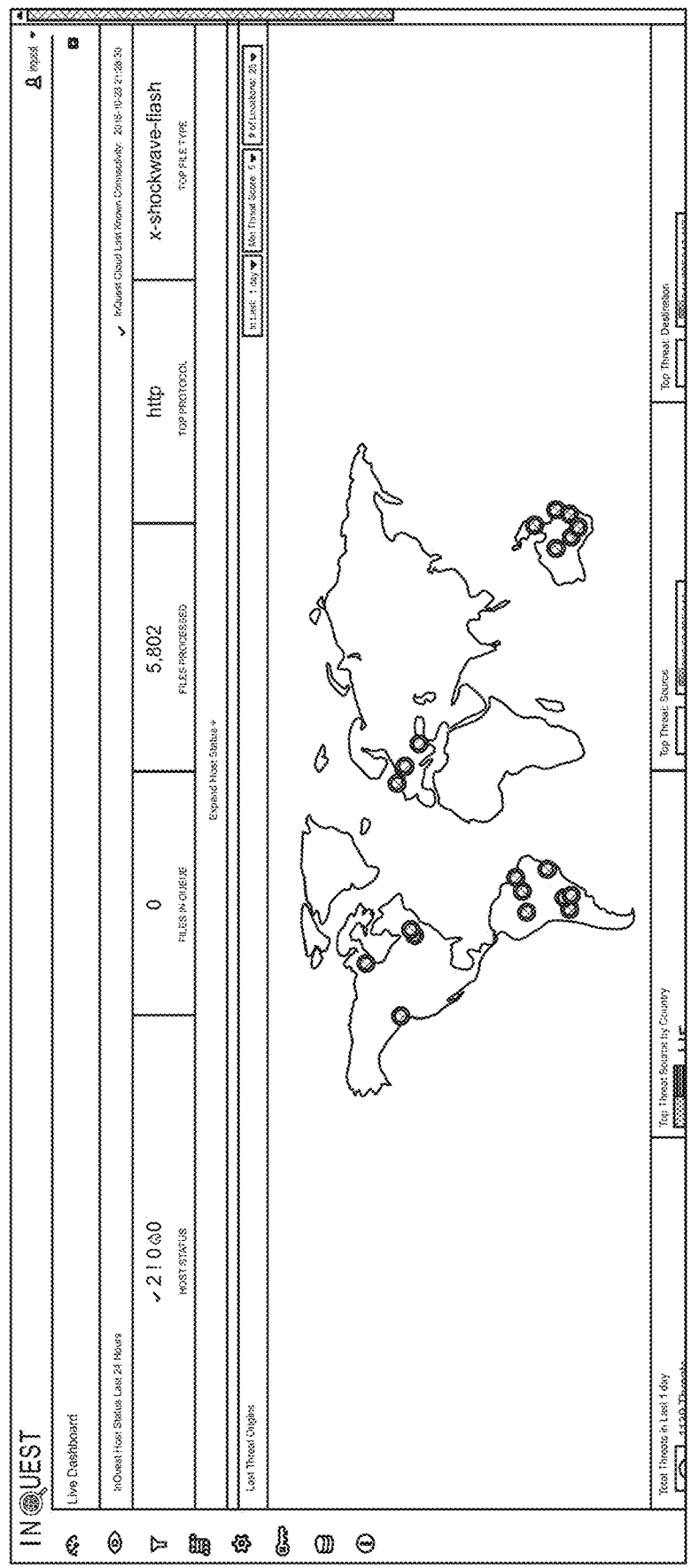
FIG. 14 illustrates an example user interface for functions associated with the threat analysis system.
Figure 15:
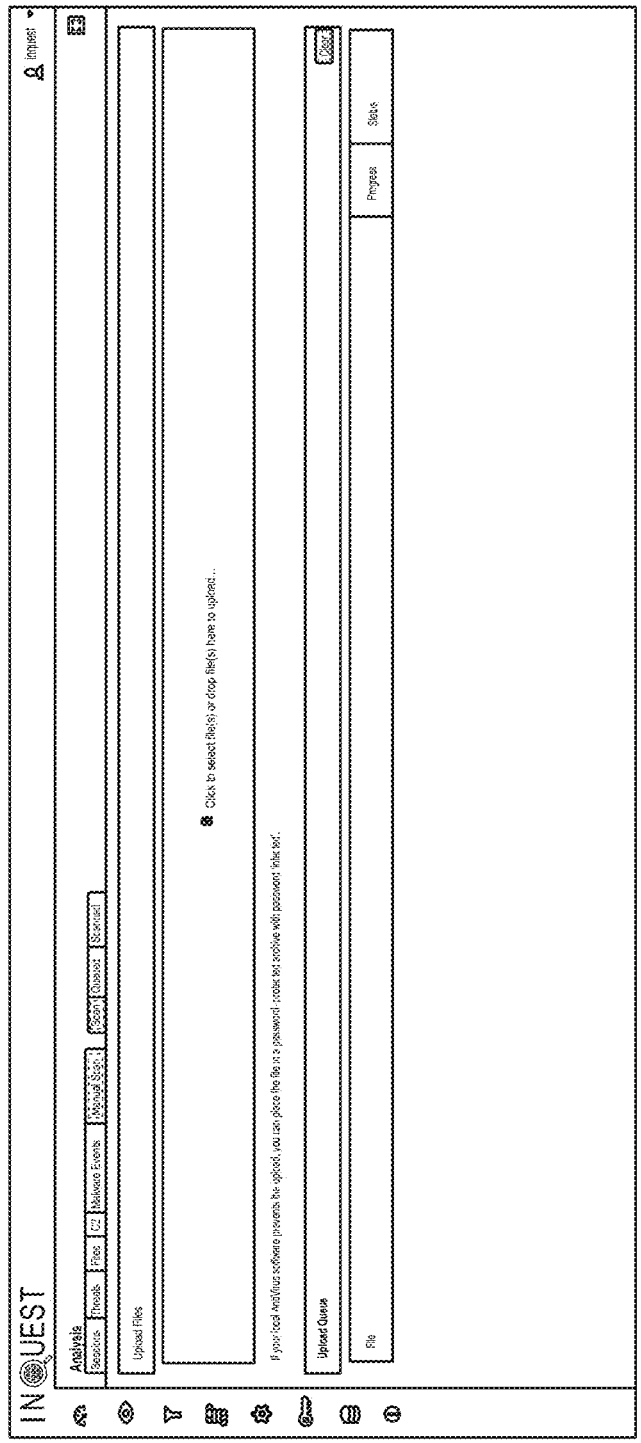
FIG. 15 illustrates an example user interface for functions associated with the threat analysis system.
Figure 16:
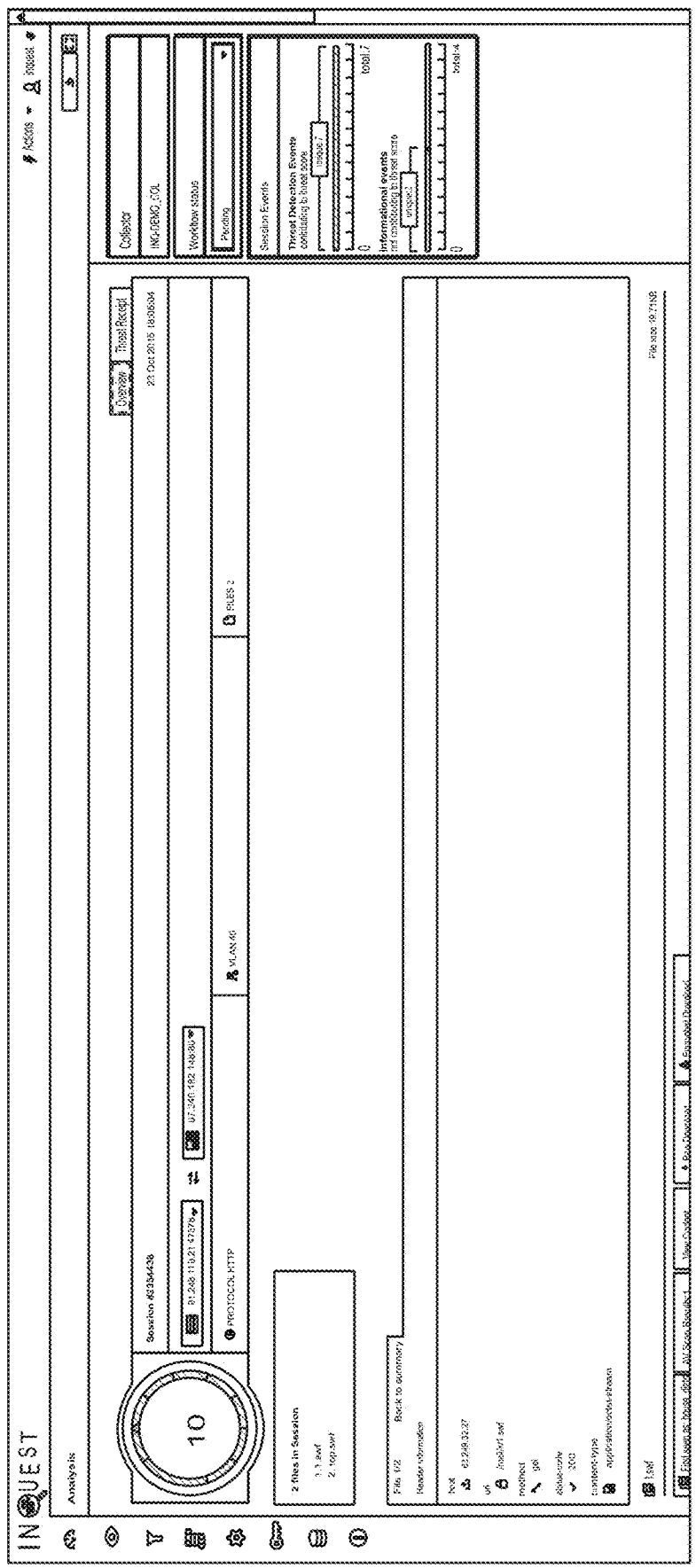
FIG. 16 illustrates an example user interface for functions associated with the threat analysis system.
Figure 18:
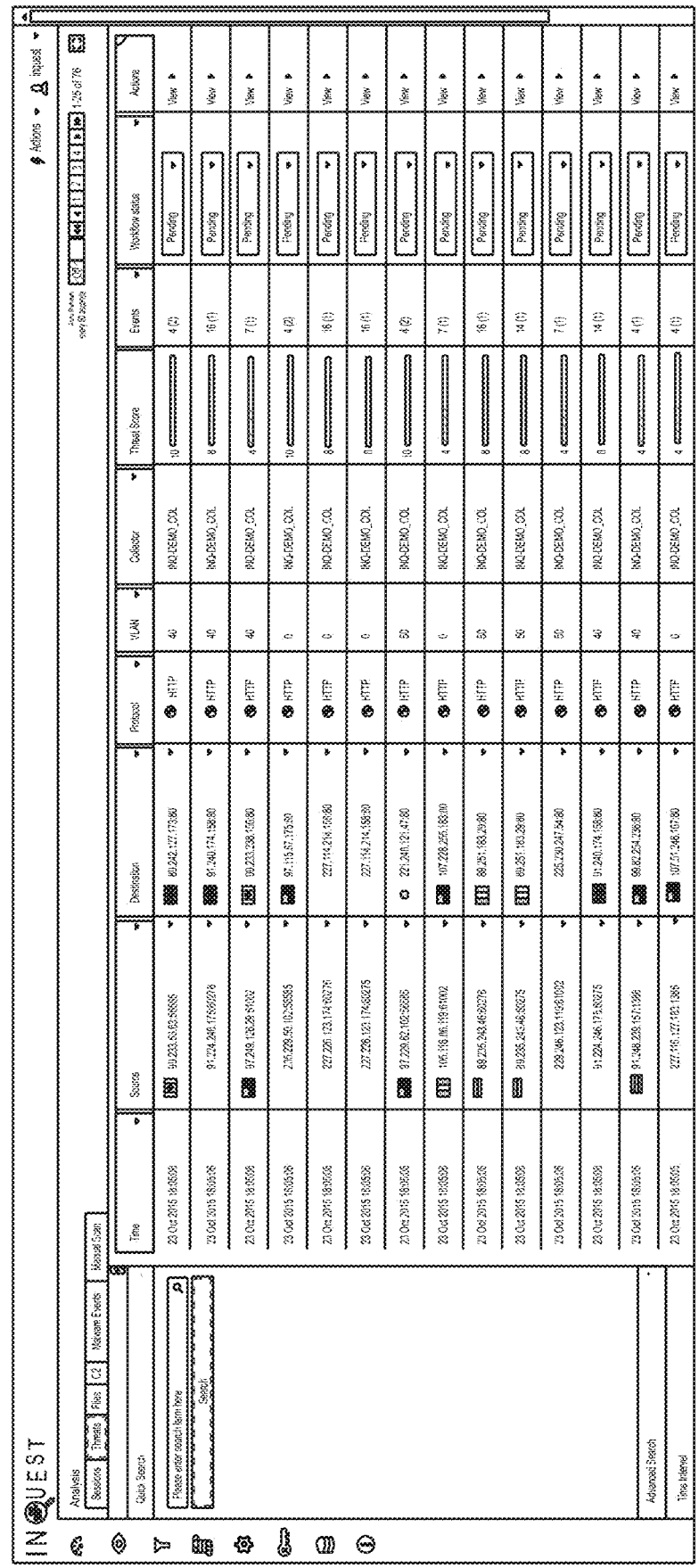
FIG. 18 illustrates an example user interface for functions associated with the threat analysis system.

As non-limiting examples, file type statistics can include user specified date and protocol, and can be configured to default to the current day and web. Example file type statistics that can be collected are illustrated in FIG. 11.

SIEM Integration

CEF compliant syslog messages can include, as non-limiting examples, static and/or dynamic analysis events, anti-virus events, and/or raw output fed back into the system where session information is aggregated to alert and sent to STEM. The system can include integration tools and SCP commands for direct download, as well as an integration command API for web interface with file hash selections.

ArcSight Integration

Figure 12:
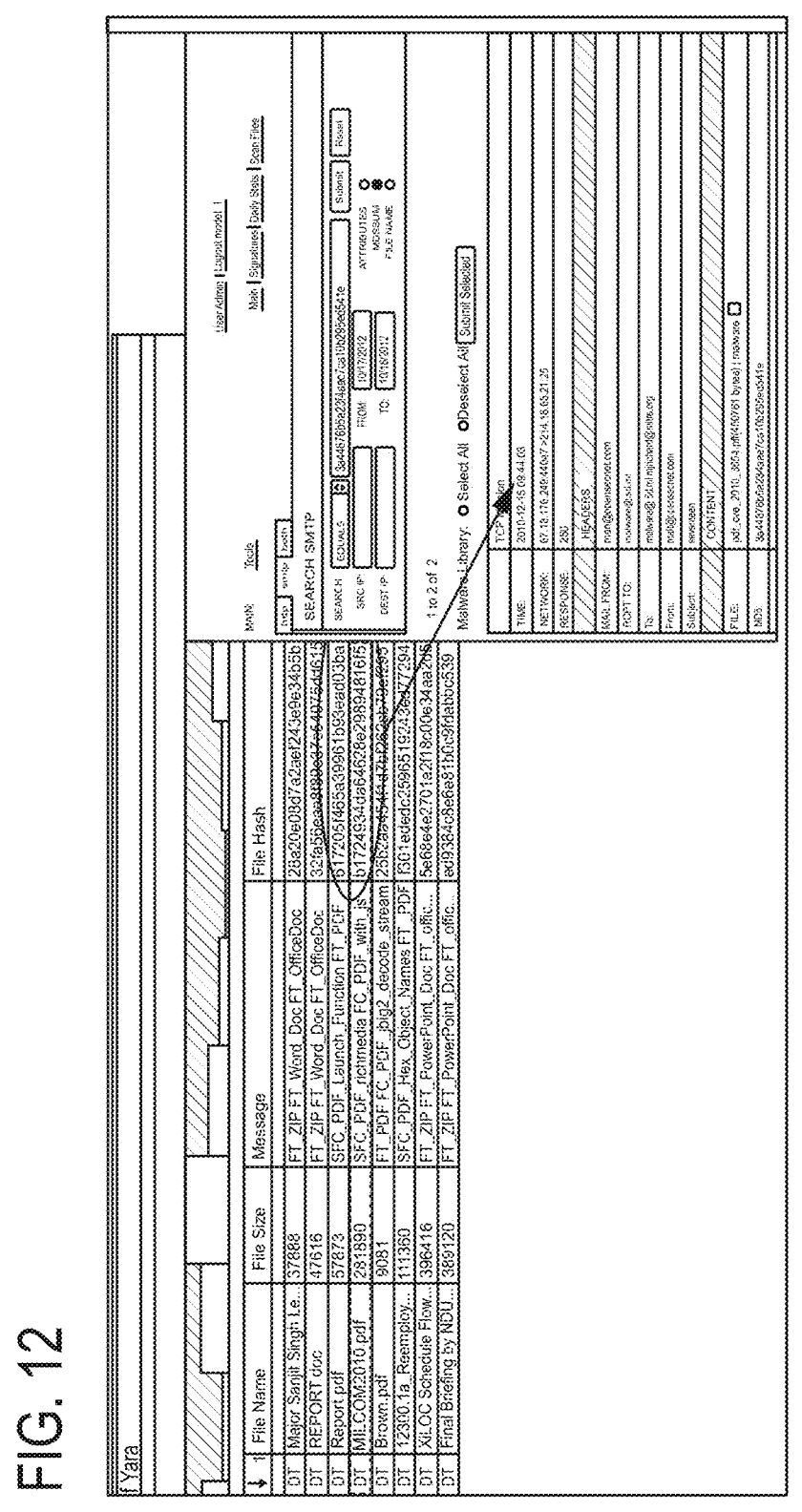

The system can include an integration command API for web interface file hash values. As illustrated in FIG. 12, in ArcSight, right-click a file hash>Integration Commands>"MD5 Lookup" can be configured to open search results for the selected hash.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

A non-limiting example system architecture for implementing the disclosed systems and methods is illustrated in FIG. 1. In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™ C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix/X-Windows™, Linux™, etc.

In some embodiments, one or more servers can function as a file server and/or can include one or more of the files used to implement methods of the invention incorporated by an application running on a user computer and/or another server. Alternatively, a file server can include some or all necessary files, allowing such an application to be invoked remotely by a user computer and/or server. The functions described with respect to various servers herein (e.g., application server, database server, web server, file server, etc.) can be performed by a single server and/or a plurality of specialized servers, depending on implementation-specific needs and parameters.

In some embodiments, the system can include one or more databases. The location of the database(s) is discretionary. As non-limiting examples, a database might reside on a storage medium local to (and/or resident in) a server (and/or a user computer). Alternatively, a database can be remote from any or all of the computing devices, so long as it can be in communication (e.g., via a network) with one or more of these. In some embodiments, a database can reside in a storage-area network (SAN). The SAN can be implemented as a computerized data storage device group. Some or all of the necessary files for performing the functions attributed to the computers can be stored locally on the respective computer and/or remotely, as appropriate. In some embodiments, the database can be a relational database, such as an Oracle database, that is adapted to store, update, and retrieve data in response to SQL-formatted commands. The database can be controlled and/or maintained by a database server.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

The invention claimed is:

1. A method implemented at a computer system for correlating network session and file information, the method comprising:

receiving, at a receiver module, packet data in a network communication session;

identifying a portion of the packet data representing a file being transferred in the network communication session over the network between a source and a destination;

associating the identified portion of the packet data with the file being transferred;

reassembling identified portions of the packet data to create a recomposed file;

storing the recomposed file in an electronic data storage device;

analyzing the packet data associated with the file to extract a network communication session parameter associated with the file and corresponding to the network communication session;

storing in the electronic data storage device, the extracted session parameter;

storing in the electronic data storage device, information identifying the recomposed file;

generating a logical link between the information identifying the recomposed file and the extracted session parameter based on the association between the identified portion of the packet data and the file being transferred;

calculating a threat score based on a weighted analysis of the recomposed file, wherein the weighting is based on one or more of reliability, false positive rate, and false negative rate of the analysis, and wherein the calculated threat score is associated with the recomposed file and the session parameter;

prompting, by a user interface of the computer system, a user to enter a parameter indicating a target network communication session;

receiving, at the user interface, the parameter entered by the user;

executing a query in the electronic data storage device to identify a file associated with the received parameter indicating the target network communication session based on the logical link between the information identifying the recomposed file and the extracted session parameter; and returning, at the user interface, the threat score and an indication of the corresponding target network communication session indicated by the parameter to the user.

2. The method of claim 1, further comprising prompting a user to enter a parameter descriptive of a target file transferred over the network;

receiving the parameter descriptive of the target file transferred over the network;

executing a query in the electronic data storage device to identify a network communication session associated with the received parameter descriptive of the target file transferred over the network based on the logical link between the information identifying the recomposed file and the extracted session parameter;

returning an identification of the network communication session associated with the received parameter descriptive of the target file transferred over the network.

3. The method of claim 1, further comprising electronically inspecting the recomposed file to determine whether the file poses a risk based on static analysis, dynamic analysis, or anti-virus scanning.

4. The method of claim 1, further comprising:

inspecting the recomposed file stored in the electronic data storage device to determine a file-type of the recomposed file, the file type associated with one or more subroutines; and executing the one or more subroutines on the recomposed file to create a post-processed version of the recomposed file for analysis by a signature-based threat scanner, wherein the threat score is calculated based on the weighted analysis of the recomposed file and the post-processed version of the recomposed file.

5. The method of claim 4, wherein the signature is selected from a signature, regular expression match, indicator of compromise, or an intrusion detection system signature.

6. The method of claim 4, wherein calculating the threat score comprises:

scanning, by the signature-based threat scanner, the recomposed file and the post-processed version of the recomposed file to generate a list of signature alerts, wherein the threat score is calculated based on the list of signature alerts.

7. The method of claim 1, further comprising:

computing a message digest of the recomposed file;

monitoring the packet data at a receiver module to determine if a second copy of the recomposed file is received;

logging session information associated with the second copy of the recomposed file without storing the second copy of the recomposed file.

8. The method of claim 1, further comprising calculating a weighted threat score based on the extracted network communication session parameter, file reputation information received from a reputation service, and the file.

9. The method of claim 1, wherein the file is an executable program, a document, an electronic mail message, a picture file, an image file, a ROM file, or a compressed file.

10. The method of claim 1, further comprising performing a second threat scan of the file based on information about the file or the network communication session parameter associated with the file.

11. The method of claim 1, wherein a determination is made to perform a second scan of the file based on receipt of new threat signature data.

12. The method of claim 1, wherein a determination is made to perform a second scan of the file based on the receipt of revised threat signature data.

13. The method of claim 1, wherein a determination is made to perform a second scan of the file based on a user request.

14. The method of claim 1, wherein a second scan of the file is performed at a relatively lower processor priority than the first scan.

15. The method of claim 1, wherein a second scan of the file is not performed if the first scan of the file is less than a user-specified amount of time in the past.

16. The method of claim 1, wherein a determination is made to perform a second scan of the file based on a MIME-type or file-type associated with the file.

17. The method of claim 1, further comprising post-processing the packet data to determine protocol type for the packet data, whether the packet data is part of an HTTP or SMTP or TCP session, and extract session and, if present, file data.

18. The method of claim 1, wherein the packet data represents an electronic mail message and wherein the method further comprises electronically storing only a header, a link, or a metadata field from the electronic mail message.

19. The method of claim 1, wherein the network communication session parameter is selected from Internet protocol addresses, hashes of files, uniform resource locators, links in electronic messages, header information or any SMTP or HTTP or TCP parameters.

20. The method of claim 1, wherein the receiver module is positioned inline between a source address and a destination address, and further comprising issuing a command to reset a connection between the source address and the destination address if a threat score associated with a file or session is higher than a predetermined threshold.

* * * * *